United States Patent [19]
Barbagli et al.

[11] Patent Number: 4,562,906
[45] Date of Patent: Jan. 7, 1986

[54] CONTROL DEVICE FOR A HYDROSTATIC TRANSMISSION IN AN EARTH MOVING MACHINE

[75] Inventors: Rino O. Barbagli, Borgaretto; Gaetano Marras, Vinovo, both of Italy

[73] Assignee: Fiatallis Europe S.p.A., Lecce, Italy

[21] Appl. No.: 487,967

[22] Filed: Apr. 25, 1983

[30] Foreign Application Priority Data

May 3, 1982 [IT] Italy .............. 67578 A/82

[51] Int. Cl.⁴ .............. B60K 41/26; B60K 20/14; G05G 5/00
[52] U.S. Cl. .............. 192/4 A; 74/475; 74/529; 74/531; 188/67; 192/3 T; 192/4 C
[58] Field of Search .............. 192/4 A, 4 C, 3 T, 3 M; 74/475, 529, 531, 473 P; 188/67

[56] References Cited

U.S. PATENT DOCUMENTS

| | | | |
|---|---|---|---|
| 1,936,149 | 11/1933 | Apple | 192/3 M |
| 2,655,231 | 10/1953 | Rossire | 74/531 X |
| 2,658,591 | 11/1953 | Medlar et al. | 74/531 X |
| 2,726,556 | 12/1955 | Greenlee | 192/4 A X |
| 2,742,123 | 4/1956 | Exline | 74/531 X |
| 2,749,825 | 6/1956 | Hirasuna | 74/531 X |
| 2,904,146 | 9/1959 | Codlin | 192/4 A |
| 3,128,635 | 4/1964 | Doolittle | 74/457 X |
| 3,556,270 | 1/1971 | Comment | 74/531 X |
| 3,893,346 | 7/1975 | Paul | 74/531 X |
| 3,954,146 | 5/1976 | Smemo | 74/531 X |
| 4,297,909 | 11/1981 | Crouse | 74/475 X |
| 4,342,335 | 8/1982 | Reincker et al. | 74/531 X |

Primary Examiner—Rodney H. Bonck
Attorney, Agent, or Firm—Emrich & Dithmar

[57] ABSTRACT

A shifting mechanism for the hydrostatic transmission of an earth moving machine comprising a shift lever manually operable by the machine operator to effect the speed and direction of movement of the vehicle. The shift lever is coupled to a hydraulically-actuated friction stop mechanism for maintaining the shift lever in a predetermined position by means of a fluid coupling which may be readily disconnected by the vehicle operator to adjust the positioning of the shift lever free from any frictional forces holding the shift lever in the prior position. A release system is provided wherein upon application of the vehicle brakes, the frictional force holding the shift lever in the predetermined position is released and the shift lever automatically returned to a neutral or idle position thereby disengaging the vehicle transmission.

8 Claims, 4 Drawing Figures

CONTROL DEVICE FOR A HYDROSTATIC TRANSMISSION IN AN EARTH MOVING MACHINE

BACKGROUND OF THE INVENTION

This invention relates in general to vehicle transmission controls and, in particular, to a transmission control for a hydrostatic transmission.

More specifically, but without restriction to the particular use which is shown and described, this invention relates to shifting mechanisms especially useful for operation with the hydrostatic transmissions of an earth moving machine for maintaining the shift lever in a predetermined position until such time as the machine operator wishes to change speed and/or direction, or stop the vehicle.

Hydrostatic transmissions are frequently utilized in earth moving machines to control the direction and speed of movement of the machine in response to movement of a shift lever controlled by the machine operator. As is known, movement of the hydrostatic transmission shift lever in a forward direction causes forward movement of the machine at progressively higher speeds, while movement of the shift lever in an opposite direction slows the vehicle down. Upon passing through a neutral or idle position, in which the transmission is disengaged, a reverse gear becomes engaged with progressively higher speeds being attained in the reverse direction as the shift lever is moved rearwardly.

During operation of the earth moving vehicle, it is desirable that once the hydrostatic transmission shift lever has been positioned to operate the vehicle in a predetermined direction at a desired speed, that the setting be maintained without requiring that the operator manually hold the shift lever in the set position. Therefore, to hold the shift lever in position for maintaining the flow of pressurized fluid through the valves which control the flow of pressurized fluid to the vehicle transmission, a friction stop mechanism may be used so that the vehicle operator does not have to continually manipulate the shift lever for it to remain in its selected position enabling the vehicle to move at the constant predetermined speed.

Stop mechanisms used for such applications have generally been of the mechanical type. In such structure one portion of the stop mechanisms is fixed to the shift lever and is moved against the friction created by a second fixed stop element against which the shift lever is held, for example, by a suitable spring. While such devices are satisfactory in holding the shift lever in a set position, such mechanical devices require a considerable amount of space and are not satisfactory for use where an adjustment of speed must be made requiring the shift lever to be moved only a slight amount from the previous position. Because the initial (static) friction encountered in moving the lever from a fixed position is much greater than the dynamic friction encountered when the lever is in actual movement, the machine operator must initially apply a larger force to begin shift lever movement, which frequently carries the shift lever beyond the desired position, requiring a number of "adjusting" movements of the shift lever before the desired "new" speed has been obtained. Consequently with such devices it is difficult to finely adjust the vehicle speed.

In an effort to overcome such problems in mechanical friction stop, the structure has been modified such as disclosed in U.S. Pat. No. 3,954,146, wherein the mechanical linkage is designed such that a variable resistance is encountered as the shift lever is increasingly displaced from the neutral or idle position to establish either maximum forward or maximum rearward driving speeds from the transmission. While such systems may be suitable for some purposes, such a variable resistance does not resolve the problems inherent in overcoming static friction when attempting to make slight modifications in the vehicle speed.

SUMMARY OF THE INVENTION

It is, therefore, an object of this invention to improve shifting mechanisms for hydrostatic transmissions.

Another object of this invention is to maintain a predetermined speed setting of a hydrostatic transmission shift lever free from manually holding the lever in position.

A further object of this invention is to releasably secure the shift lever of a hydrostatic transmission in a desired position to facilitate slight adjusting movement of the shift lever to obtain a precise desired speed.

Still another object of this invention is to automatically release and move the shift lever of a hydrostatic transmission to a neutral or idle position upon the application of the vehicle brakes.

These and other objects are attained in accordance with the present invention wherein there is provided a shifting mechanism for the hydrostatic transmission of an earth moving machine comprising a shift lever manually operable by the machine operator to effect the speed and direction of movement of the vehicle. The shift lever is coupled to a hydraulically actuated friction stop mechanism for maintaining the shift lever in a predetermined position by means of a fluid coupling which may be readily disconnected by the vehicle operator to adjust the positioning of the shift lever free from any frictional forces holding the shift lever in the prior position. A release system is provided wherein upon application of the vehicle brakes, the frictional force holding the shift lever in the predetermined position is released and the shift lever automatically returned to a neutral or idle position thereby disengaging the vehicle transmission.

DESCRIPTION OF THE DRAWINGS

Further objects of the invention, together with additional features contributing thereto and advantages accruing therefrom will be apparent from the following description of a preferred embodiment of the invention, which is shown in the accompanying drawings, with like reference numerals indicating corresponding parts throughout, wherein.

DESCRIPTION OF THE PREFERRED EMBODIMENT

Figures 1, 2:
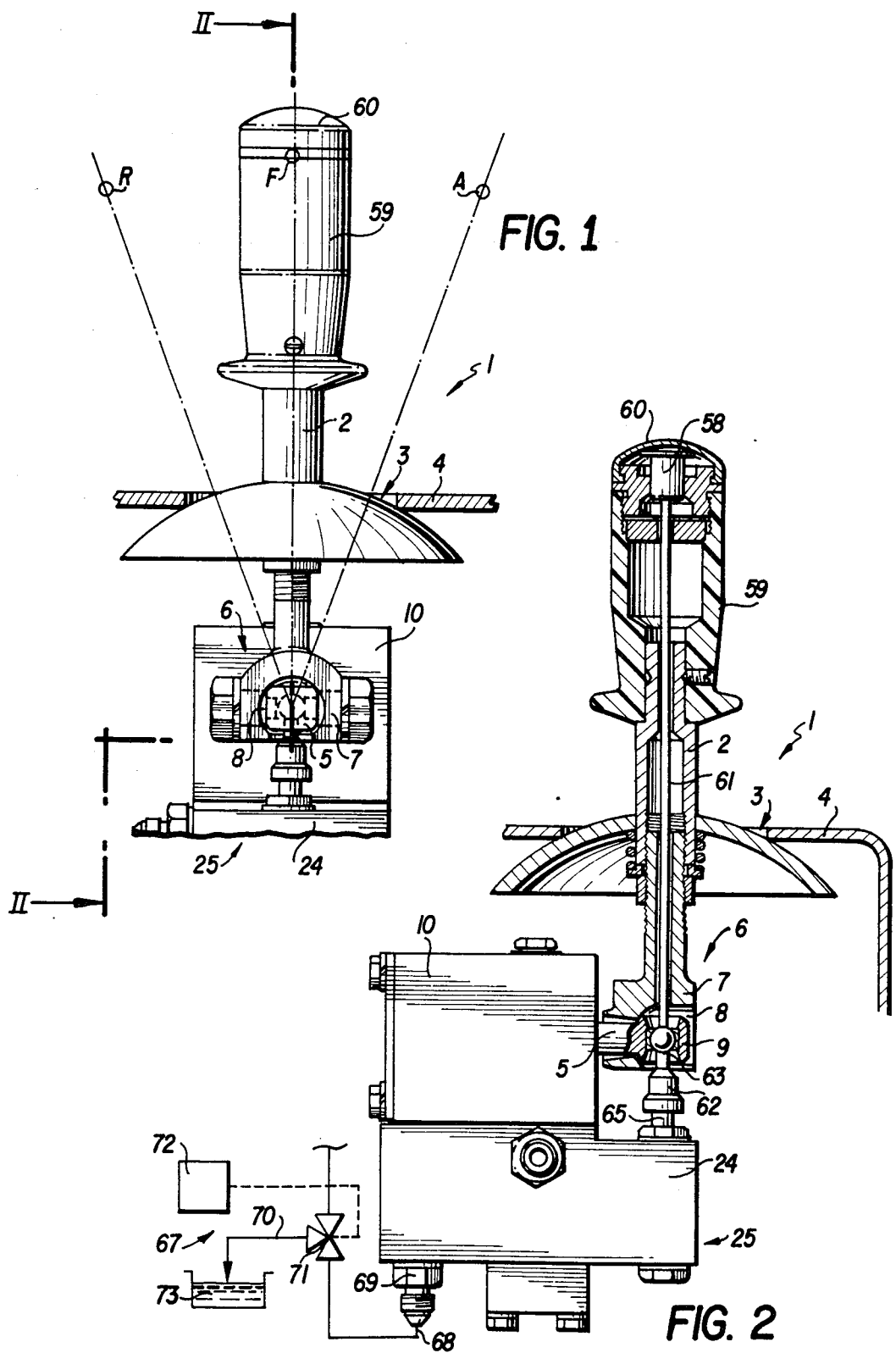
FIG. 1 is a side elevational view of a portion of a control mechanism for a hydrostatic transmission of an earth moving machine.
FIG. 2 is a view of the structure shown in FIG. 1 taken along the line 11—11 with the shift lever shown in section and additional elements of the control mechanism shown therein.

Referring now to FIGS. 1 and 2 there is shown a transmission control mechanism 1 which is used in controlling the operation of a hydrostatic transmission of an earth moving vehicle, not shown. The transmission control mechanism 1 comprises a shift lever 2 which is carried on the dashboard 4 of a vehicle, and projects through an opening 3 to position the shift lever 2 in a position to be operated manually by the vehicle operator from the vehicle driving seat in order to control the vehicle movement.

A spherical dirt cap is carried by the shift lever 2, and held against the edge of the opening 3 in the dashboard 4 by a spring to prevent dirt and/or debris from entering into the shift lever mechanism and to minimize noise transmission into the operator's compartment. The shift lever 2 is secured to a control shaft 5 with the shift lever 2 extending radially outwardly from an end thereof in a direction substantially perpendicular or normal to the longitudinal axis of the control shaft 5.

The shift lever 2 can be oscillated about the longitudinal axis of the control shaft 5, between two opposite and equidistant end positions A and R indicated by the dashed lines in FIG. 1. Equidistant between the two positions A and R is an intermediate position F, indicated by the dashed center line of the control lever 2, which corresponds to an idle or neutral position wherein the vehicle transmission is disengaged with the vehicle thus remaining at rest. When the shift lever 2 is positioned between the neutral or idle position F and position A, the shift lever controls the forward travel of the vehicle with the forward speed increasing progressively as the shift control lever 2 is moved from the neutral or idle position F towards the furthermost position A. When the shift lever 2 is positioned between the neutral or idle position F and R, the shift lever 2 controls the reverse movement of the vehicle with the speed of movement increasing as the shift lever is moved toward the furthermost position R.

The shift lever 2 is connected to the control shaft 5 by a joint 6, which enables the shift lever 2 to be moved in a lateral direction transversely to the plane in which the shift lever moves to effect a change of the vehicle's speed and/or direction. To this end a lower end 7 of the shift lever 2 is provided with a cavity 8 in which one end 9 of the control shaft 5 is positioned in such a manner that the shift lever 2 is so movable.

Figure 4:
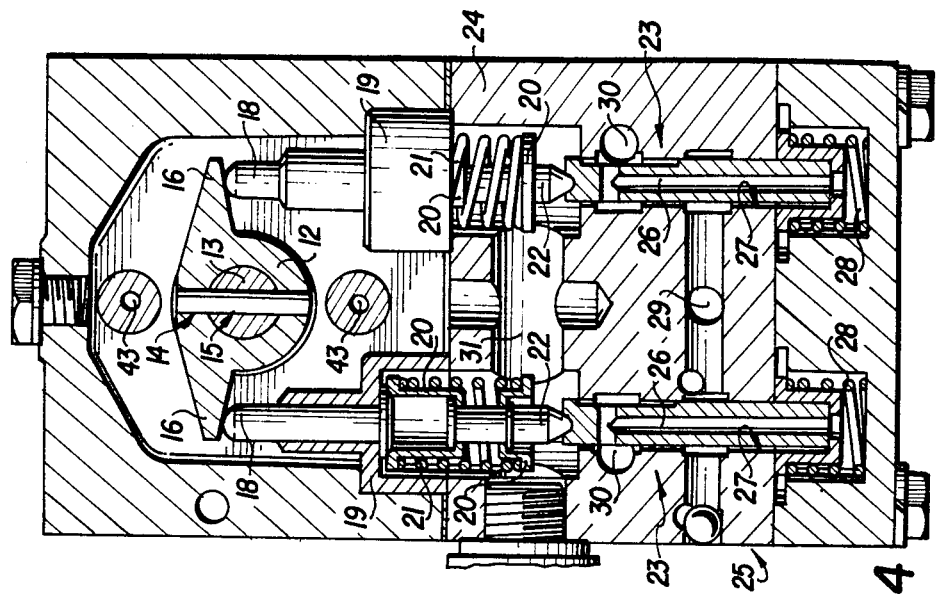
FIG. 4 is a sectional view of the structure shown in FIG. 3 taken along lines 4—4.
Figure 3:
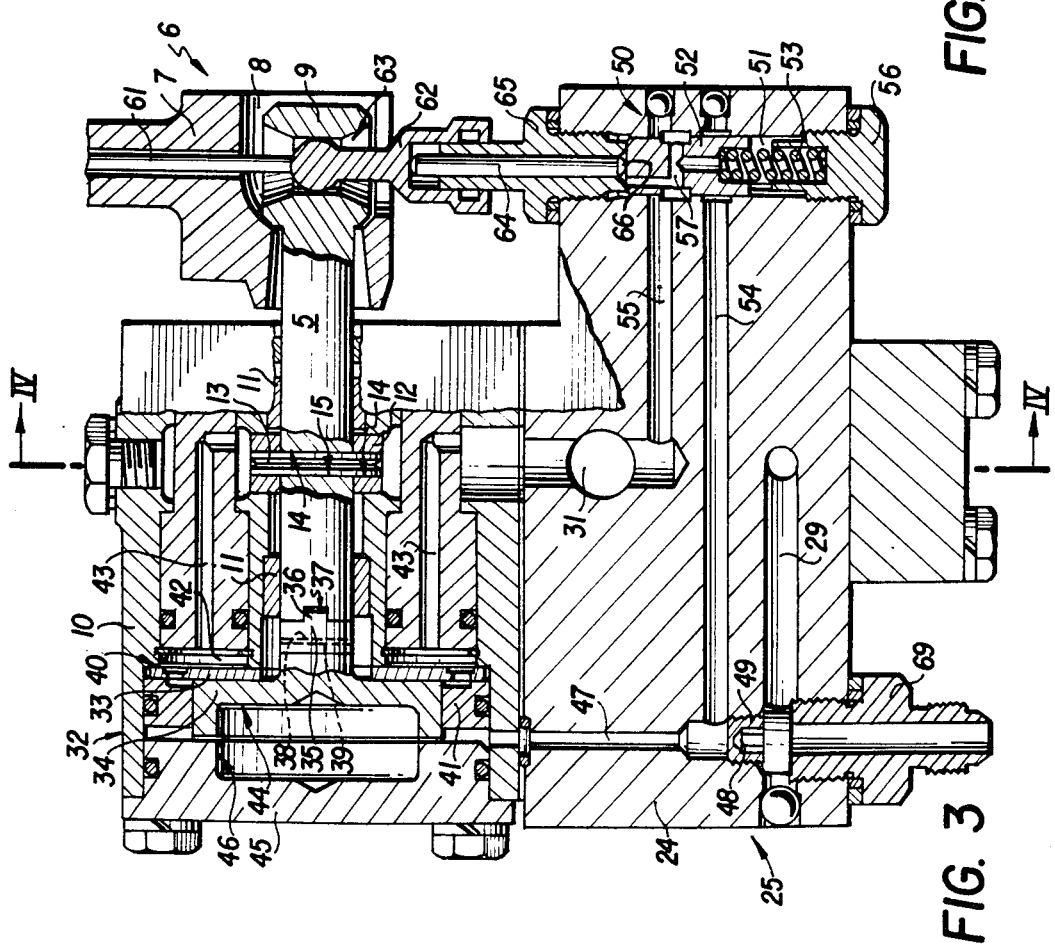
FIG. 3 is an enlarged sectional view of a portion of the central mechanism to better illustrate the manner in which a hydraulically-actuated friction stop mechanism is coupled through a control shaft to a transmission shift lever to releasably hold the shift lever in a desired position.

As shown in FIG. 3, the control shaft 5 is supported in a housing 10 with suitable bearings 11 which rotatably support the control shaft 5 for rotational movement in the housing. The control shaft 5 carries a rocker lever 12 (best shown in FIG. 4), fixed thereto for rotational movement therewith by a resilient pin 13 carried in transverse bores 14 and 15 formed in the rocker lever 12 and control shaft 5, respectively. The rocker lever 12 includes two opposing contact arms 16 which engage the free ends of two parallel positioned push rods 18 through which the speed control and movement of the vehicle are effected.

The push rods 18 are carried within the housing 10 by bushings 19 and are reciprocable along their longitudinal axis to convert the rotary motion of the control shaft 5 and rocker lever 12 into translatory motion for effecting the opening and closing of two hydraulic regulating valves 23 through which the forward and reverse travel of the vehicle is effected. Each of the hydraulic regulating valves 23 is disposed in the body 24 of a hydraulic distributor 25, to which the housing 10 is fixed in a fluid tight manner. A compression spring 21 is positioned concentrically about each push rod 18 extending between two spaced collars 20, with one collar supported from the push rod 18 and the other from a concentrically positioned push pin 22 which contacts a spool 26 of each of the hydraulic regulating valves 23. The compression springs 21 exert a biasing force on the push rods 18 for returning the push rods, and thereby the shift lever 2, to the neutral position terminating the flow of pressurized hydraulic fluid to the vehicle transmission through valves 23.

The hydraulic regulating valves 23 are of a known type which control the pressure of a fluid fed to the hydrostatic transmission in order to select the vehicle travel direction and speed. Each of the valves 23 includes the movable spool member 26 journalled for reciprocal movement in a valve seat 27, and further biased for movement into a closed position terminating the flow of the pressurized fluid by a concentric compression spring 28. The valve 23 is positioned such that the spool 26 may be moved to connect a pressurized fluid inlet duct 29 to ducts 30 for coupling to the machine transmission circuits, (of a known type and not shown), and to a discharge line 31.

Upon rotational movement of the shift lever 2, the rocker lever 12 will also rotate so that its arms 16 contacting the push rods 18 will cause one of the spool members 26 to move, and thus the corresponding hydraulic regulating valve 23 will progressively open and/or close according to the direction of movement of the shift lever 2. Thus, the hydraulic regulating valves 23 adjust the pressure of fluid fed to the machine transmission, in order to select the vehicle travel direction and speed with one of the hydraulic regulating valves 23 providing for forward travel and the other for reverse travel in accordance with the flow of pressurized fluid therethrough.

If no force is applied to move or hold the shift lever 2 in a predetermined position, the shift lever will be returned to the idle or neutral position F. The action of the compression springs 28 and 21, will move the valve spools 26 upwardly into a closed position, causing the push rods 18 to extend outwardly against the arms 16 of the rocker lever 12 and returning the shift control lever 2 to the neutral or idle position F. Upon closing the hydraulic regulating valves 23, the flow of pressurized fluid to the vehicle transmission will be terminated.

In order to retain the shift control lever 2 in the position selected by the machine operator, against the homing action of the compression springs 28 and 21, the shift control mechanism 1 is provided with a hydraulically-actuated friction stop 32 contained in the housing 10. The hydraulically-actuated friction stop 32 includes a first stop disk 33 selectively held in a fixed position relative to the housing 10 in a manner to be hereinafter described, and a second stop disk 34 which is coupled to the control shaft 5 for rotational movement therewith by means of an intermediate coupling 35. The coupling 35 (best shown in FIG. 3), is engaged with the control shaft 5 by means of a tooth 36 which extends across the face of the coupling and engages a corresponding mating slot 37 formed in the control shaft 5. The coupling 35 is engaged on its opposite face by the disk 34 by means of a slot 38 formed therein in a direction perpendicular to the slot 37 which is engaged by a tooth 39 formed on a central raised portion of the face of the disk 34. The connection between the control shaft 5 and the stop disk 34 in this manner provides for a continuously engaging coupling even if an eccentricity exists between the control shaft and the stop disk.

The first stop disk 33 is selectively fixedly connected with the housing 10 by means of a piston 41 carried in the housing 10 concentrically about stop disk 34. The opposed face of disk 33 defines a chamber 42 facing the control shaft 5 and connected by ducts 43 to the discharge line 31. Upon pressure being applied to piston 41, in a manner to be hereinafter described, piston 41 will contact the stop disk 33 to apply a force against the stop disk 33 to hold the disk against the shoulder 40 which in cooperation with stop disk 34, will apply a frictional force between the stop plates or disks to prevent rotational movement of the control shaft 5 and shift lever 2.

The opposed face of stop disk 34 has an opposite facing surface 44 which together with the face cover 45 of the housing 10, defines a pressure chamber 46 which is hydraulically connected by a discharge line 47 to the feed duct 29, to control engagement of the hydraulically-actuated friction stop mechanism. The movement of the floating piston 41 is effected by the pressurized fluid flowing through the feed line 29, and passing into the chamber 46 through line 47. When the pressurized fluid is coupled thereto, the fluid pressure will act against the friction stop mechanism 32 to prevent relative rotation between the stop disks 33 and 34 thereby holding the control lever 2 in any position selected by the vehicle operator. In this respect, the facing surface 44 of the stop disk 34 is arranged such that the fluid pressure existing in chamber 46 will urge the stop disk 34 against the stop disk 33 with a predetermined force, while the stop disk 33 is held in a stationary position by the force exerted through the piston 41 holding the stop disk against the shoulder 40 of the housing 10.

Since the pressurized fluid coupled to the hydraulic distributor 25 to operate the hydrostatic transmission provides the source of pressure for actuating the hydraulically-actuated friction stop mechanism 32 to retain the shift lever 2 in a selected position, when it is desired to move the shift lever 2, during machine operation, means must be provided to release or vent the pressure in chamber 46 while maintaining the flow of pressurized fluid for continuing machine operation, such as when it is desired to increase or decrease vehicle speed or change direction of movement. Therefore, the fluid coupling between the line 47 and line 29 is made through a sized orifice 48, of a predetermined diameter, providing in a bushing 49 carried within the hydraulic distributor 25 between the fluid lines 47 and 29. The size of the orifice is arranged to hydraulically connect the line 29 to the line 47 with a predetermined pressure drop thereacross. In this manner line 49 remains under pressure when the line 47 is connected to the discharge duct 31, which occurs when the hydraulic friction stop mechanism 32 is disengaged by the machine operator in order to manually shift the control lever 2.

In order to disengage the hydraulic friction stop mechanism 32, the pressure in the pressure chamber 46 is discharged by connecting the pressure chamber to the discharge duct 31. This operation is effected through operation of a pressure release valve 50 comprising a movable spool element 52 slidable in a chamber 51, provided in the housing body 24, against the action of a compression spring 53. One end of the compression spring 53 is in contact with a chamber plug 56, and the opposed end is carried within a cavity of the spool 52 to exert an upward force (FIG. 3) on the spool 52 upon compression of the spring 53 to return the spool to a position preventing fluid flow between lines 54 and 55.

The chamber 51 is coupled to line 47 by a duct 54, and to the discharge duct 31 by another line 55 parallel to the first duct 54. The spool 52 of valve 50 is movable between a first position illustrated in FIG. 3, into which it is biased by compression spring 53, in which the spool 52 isolates the duct 54 from the duct 55. In this position the chamber 46 is maintained under pressure and thus the hydraulic friction stop mechanism 32 is engaged. In the second position (not shown) the spool 52 is displaced downwardly toward the plug 56, in which position a bore 57 in the movable spool 52 connects the duct 54 to the duct 55 thereby venting the pressure in pressure chamber 46 to the discharge duct 31. When the valve 50 is in this position, the hydraulic friction stop mechanism will be disengaged through the venting of the pressure in pressure chamber 46, such that the shift control lever 2 can be freely manipulated without encountering any frictional resistance.

Operation of the pressure release valve 50 is controlled by the vehicle operator by means of a push button 58 (FIG. 2), which is manually operated by the vehicle operator, and contained in a grip 59 of the control lever 2 under a deformable cap 60, preferably made of rubber. The downward movement of the push button 58 is transmitted to the valve spool 52 by means of a linkage system including a rod 61 slidably housed within the shift control lever 2. The rod 61 is arranged to transmit the movement of the push button 58 to a cap 62, which has an upper end contained in a transverse bore 63 formed in the end 9 of the control shaft 5. A push rod 64 is carried co-axial with the movable valve spool member 52, and housed in a plug 65 which closes the other end of the chamber 51 opposite to the plug 56. The push rod 64 has one end 66 in contact with the movable valve spool 52, and is arranged to receive the reciprocal movement from the cap 62 and to transmit this motion to the valve spool 52 in order to move the valve spool downward toward the plug 56, thereby coupling the two conduits 54 and 55 for discharging the pressure in the pressure chamber 46.

In operation, in order to move the shift control lever 2 and thus select a certain speed, the machine operator has only to press the push button 58 downwardly. The valve spool member 52 will then connect the fluid line 47 to the discharge line 31, to vent the pressure in pressure chamber 46. When the pressure in pressure chamber 46 is vented the stop disk 34 will no longer be held against movement by the frictional force of stop disk 33 by the fluid pressure contained in the chamber 46, and thus the shift control lever 2 can be moved substantially without encountering any resistance. However, because of the restriction of the orifice 48, when the chamber 46 is vented, the fluid line 29 remains under pressure to allow pressurized fluid to continue to be fed to the hydraulic regulating valve 23 so that the hydrostatic transmission does not become disengaged. Upon the vehicle operator releasing the push button 58, the valve spool 52 will be returned to its initial position under the biasing effect of the compression spring 53, terminating the coupling between the two discharge lines 54 and 55. The pressure within the pressure chamber 46 will again increase forcing the stop disk 34 into contact with stop disk 33 and holding the stop disk 33 against the shoulder 40 of the housing 10. In this manner the control shaft 5 and, thereby, the control shift lever 2 will be held in the new position through the frictional engagement between the two stop disks 33 and 34.

In case of the sudden braking of the vehicle, provision is made for the control shift lever 2, and the control lever 5, to automatically return to the neutral or idle position F to disengage the vehicle transmission. To this end a hydraulic circuit 67 (shown diagramatically in FIG. 2), also forms part of the transmission control mechanism 1. The hydraulic circuit 67 includes a feed line 68 which is connected to a feed union 69 secured into the valve body 24 for coupling pressurized fluid to the fluid lines 29 and 47. A discharge line 70 is connected to line 68 by a three-way valve 71, the operation of which is automatically controlled by the vehicle braking system 72, shown diagramatically. When the braking system 72 is actuated, the flow of pressurized fluid will be discharged through line 70 to sump 73, to which the discharge duct 31 is also coupled in a known manner, not shown.

When the pressurized fluid is dumped to sump, through line 70 upon actuation of the braking system 72, the loss of pressure effected by the operation of the valve 71 terminates the flow of pressurized fluid through line 68 to the transmission control system. Termination of the flow of pressurized fluid to the transmission control system 1 will release the pressure in the pressure chamber 46 thereby disengaging the hydraulically-actuated friction stop 32 and allowing the action of the compression springs 28 to move the valve spools 26 upwardly returning the shift control lever 2 to the neutral or idle position F and disengaging the vehicle transmission. In this manner the hydraulically-actuated friction stop mechanism 32 provides a means for retainably securing the shift control lever 2 in a desired position, which may be readily released for friction-free movement to a new setting during machine operation, while enabling the transmission control systems to be automatically placed in a neutral or idle position upon actuation of the vehicle brake.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A vehicle transmission control mechanism including a hydraulically-actuated friction stop for releasably holding a transmission shift lever in a set position through the use of a fluid pressure used for controlling the operation of a hydrostatic transmission, wherein the hydraulically-actuated friction stop may be selectively disengaged enabling movement of a transmission shift lever without interrupting the operation of the hydrostatic transmission, comprising a transmission shift lever operatively connected to a control shaft for effecting movement of a vehicle in accordance with the positioning of the control shaft in response to the movement of said shift lever, said control shaft operatively connected to a hydraulically-actuated friction stop such that engagement of the hydraulically-actuated friction stop releasably holds said control shaft and thereby said shift lever in a set position, hydraulic pressure valve means actuatable for controlling the operation of a hydrostatic transmission in response to hydraulic fluid coupled thereto through said hydraulic pressure valve means, said hydraulic pressure valve means being actuated to couple hydraulic fluid to the hydrostatic transmission by movement of said control shaft, a hydraulically-actuated friction stop actuatable for holding said control shaft and thereby said transmission shift lever in a set position in response to the presence of a source of fluid pressure coupled thereto, a source of fluid pressure coupled in fluid communication to said hydraulic pressure valve means and said hydraulically-actuated friction stop for the actuation thereof in response to the presence of said fluid pressure, a flow restrictor coupled into fluid communication between said source of fluid pressure and said hydraulically-actuated friction stop for establishing a pressure drop thereacross such that a reduction in fluid pressure communicated to said hydraulically-actuated friction stop will not inactivate the operation of the hydrostatic transmission through said hydraulic pressure valve means, and release means to selectively reduce the fluid pressure coupled to said hydraulically-actuated friction stop for the disengagement thereof so that said shift lever and thereby said control shaft may be moved from the set position.

2. The transmission control mechanism as defined by claim 1 wherein said release means includes a release valve manually actuatable to bypass the source of pressurized fluid coupled to said hydraulically-actuated friction stop through a discharge line to sump, thereby reducing the fluid pressure exerted on said hydraulically-actuated friction stop and effecting the disengagement thereof.

3. The transmission control as defined by claim 2 wherein said release means includes a linkage mechanism carried within said transmission shift lever and operable to actuate said release valve.

4. The transmission control mechanism as defined in claim 2 wherein said release valve includes a movable spool having a fluid communication bore formed therein and carried between said source of fluid pressure and said sump, said spool being biased into a blocking position by a compression spring such that upon the application of a force sufficient to move said spool against the compression spring said fluid communicating bore will couple said source of fluid pressure to sump, and upon the absence of such a force the compression spring will move said spool to a blocking position.

5. The transmission control mechanism of claim 4 wherein said release means includes a rod concentrically positioned within said shift lever and movable therein for applying a force against said movable valve spool sufficient to compress said compression spring to effect fluid communication through said fluid communication bore formed therein.

6. The transmission control mechanism as defined in claim 1 further including means operable upon the braking of the vehicle to bypass the source of fluid pressure from being coupled in fluid communication to said hydraulic pressure valve means and said hydraulically-actuated friction stop to sump thereby automatically placing the hydrostatic transmission in a neutral position.

7. The transmission control mechanism as defined in claim 1 wherein said hydraulically-actuated friction stop includes a first and a second stop disk.

said first stop disk being fixed in a stationary position upon the coupling of fluid pressure in communication therewith, said second stop disk being secured to one end of said control shaft and engagable with said first stop disk to be engaged therewith upon the coupling of fluid pressure in communication therewith.

8. The transmission control mechanism as defined in claim 5 wherein an obverse face of said second stop disk from a face of said second stop disk which engages said first stop disk forms a portion of a pressure chamber in fluid communication with said source of fluid pressure coupled in fluid communication with said hydraulically-actuated friction stop to hold said first and second stop disks in engagement upon the coupling of a source of fluid pressure thereto.

* * * * *